United States Patent [19]

Rakestraw et al.

[11] 3,996,074

[45] Dec. 7, 1976

[54] METHOD FOR IMPROVING HYDROLYTIC STABILITY OF THE BOND BETWEEN STEEL SURFACES AND ORGANIC ADHESIVES

[75] Inventors: Lawrence F. Rakestraw, Raleigh; Richard W. Bullard, Durham; John E. Niesse, Raleigh; Malcolm F. Bender, Durham, all of N.C.

[73] Assignee: Monsanto Company, St. Louis, Mo.

[22] Filed: Aug. 28, 1975

[21] Appl. No.: 608,428

[52] U.S. Cl. .................. 148/6.16; 148/6.15 Z; 148/31.5; 428/382; 428/383; 427/409; 152/357 R

[51] Int. Cl.$^2$ ............................................. C23F 7/10

[58] Field of Search ............ 148/6.15 Z, 6.16, 31.5; 428/465, 466, 379, 382, 383; 156/124

[56] References Cited

UNITED STATES PATENTS

| | | | |
|---|---|---|---|
| 2,774,701 | 12/1956 | Koryta | 148/6.15 Z X |
| 3,817,778 | 6/1974 | Wright | 428/379 X |
| 3,857,726 | 12/1974 | Van Gils | 148/6.15 R |

OTHER PUBLICATIONS

Cox, Rubber Journal, 4–69, pp. 49–57.

*Primary Examiner*—Ralph S. Kendall
*Attorney, Agent, or Firm*—Russell E. Weinkauf

[57] ABSTRACT

A method is disclosed for improving the hydrolytic stability of the adhesive bond between an RFL type organic adhesive and the steel reinforcing element in steel-rubber composite articles. This is accomplished by a pre-treatment of the steel surface before it is coated with the organic adhesive. The pre-treatment is conducted in a continuous operation which includes the sequential steps of: (1) cleaning the metal surface by a vapor degreasing method or by immersion in a detergent containing aqueous bath followed by a hot water rinse; (2) coating the surface with a crystalline or microcrystalline zinc phosphate; (3) rinsing the phosphated steel surface with water; (4) subjecting the phosphated surface to a chromate or chromic acid rinse; (5) rinsing again with deionized water; and finally (6) drying the steel reinforcing element.

14 Claims, No Drawings

METHOD FOR IMPROVING HYDROLYTIC STABILITY OF THE BOND BETWEEN STEEL SURFACES AND ORGANIC ADHESIVES

This invention pertains to the general field of steel-rubber composites in which an organic adhesive is interposed between the two materials to effect a metal-to-rubber bond. More particularly, the invention relates to a method for improving the hydrolytic stability of the bond between the steel reinforcing component of the composite and the metal-to-rubber organic adhesive.

BACKGROUND OF THE INVENTION

Composites of steel and rubber wherein reinforcing elements of steel or steel alloys are bonded to rubber find wide application in a variety of products which include, for example, conveyor belts, heavy duty hoses, pulley belts and pneumatic tires. The application of such composites in the fabrication of pneumatic tires has become particularly important. That is, there has been an ever increasing use of steel cord to provide the need for more effective reinforcement in modern vehicular tires.

The traditional method for bonding rubber to steel is to plate the steel surface with brass for direct contact to rubber. However, because of its unpredictability, sensitivity to processing conditions and rubber composition together with a tendency towards rapid deterioration in chemical environments, new approaches to bonding these materials have been sought for some time as a replacement for the brass plate method. In seeking a new approach particular attention has been given to the use of various organic resin adhesives for application to the steel surface prior to pressing into contact with the rubber component. During the course of such investigations, it has been found that the well known RFL type organic adhesives, which have been used for many years in the bonding of polymeric fibers to rubber, offer exceptional promise as a practical means for bonding steel to rubber without the problems associated with brass plating.

The basic RFL adhesive composition was first described in U.S. Pat. No. 2,128,229 which issued in 1938 and consists of an aqueous emulsion of a resorcinol-formaldehyde resin and a rubber latex. Although there have been various improvements and additions to this basic formulation over the years, such as are described in U.S. Pat. Nos. 3,817,778 and 3,835,082, these additions and improvements have not fundamentally altered the character of the basic composition and all such variants are generally referred to as RFL type organic adhesives.

Although the use of these adhesives as the bonding agent in the fabricatin of steel and rubber composites has produced generally satisfactory results, a drawback has recently been observed which is manifested when articles comprised of such composites are subjected to moisture-containing environments during use. That is, it has been found that the bond between the adhesive and the steel surface becomes weakened in the presence of water. When exposure to moisture is prolonged, the steel reinforcing element tends to separate from the adhesive binding it to the rubber and the separated surface becomes exposed to the corrosive effects of the aqueous environment. Eventually, the deterioration caused by this separation and corrosion results in failure of the composite product.

This problem was first observed during the course of a test program on steel radial tires in which an RFL adhesive was used to bond the steel to rubber. The test tires were installed on a fleet of vehicles which were driven in areas of rough terrain and often under wet conditions. As a result, the tires incurred various cuts or punctures while under test in this environment. It was noticed that after the appearance of these punctures or cuts (say between about 5,000 and 27,000 miles later depending on number or size) a debonding between the steel cords and the rubber took place. The debonding manifests itself in the early stages by the movement ("wire walking") of steel cord toward edges of the belt. Eventually the cords penetrate the tire tread at the belt-sidewall interface and bare cord is observed protruding from these areas. This phenomenon is called whiskering. Complete separation between the belt and tread finally occurs in the later stages with considerable cord corrosion being observed.

This loss of adhesion between steel cords and rubber when tires are cut (or punctured) and driven under wet conditions is attributed to a weakening of the adhesive bond between the RFL adhesive and the steel surface when exposed to moisture. The moisture, of course, gains entrance to the bonding system via cuts or punctures in the tire.

It is, therefore, an object of this invention to improve the hydrolytic stability of the adhesive bond between an RFL type organic adhesive and the surface of steel reinforcing elements employed in composites of rubber and steel.

It is a further object of the invention to prevent the loss of adhesion between steel reinforcing elements and rubber when vehicular tires become cut or punctured and are driven under wet conditions.

SUMMARY OF THE INVENTION

The afore-mentioned objects and purposes of the invention are accomplished by a pre-treatment of the surface of the steel reinforcing element before it is coated with an RFL adhesive which bonds the element to rubber. Stated in broad terms, the pre-treatment includes the following basic steps taken in sequence: (1) cleaning the surface of the steel reinforcing element by the method of vapor degreasing; (2) coating the cleaned surface with a crystalline or microcrystalline zinc phosphate; (3) rinsing the phosphate coated steel surface with water; (4) subjecting the phosphated surfaces to a further rinse with an aqueous solution of chromate or chromic acid; (5) rinsing the surface with deionized water to remove excess chromate or chromic acid solution; and (6) drying the treated steel surface.

As an alternative to the vapor degreasing step (1) above, the surface of the steel reinforcing element may likewise be cleaned and prepared for receiving the phosphate coating by immersion in an aqueous cleaning solution. When this cleaning procedure is employed, it is necessary that it be followed by a hot water rinse before the zinc phosphate coating is applied.

DETAILED DESCRIPTION OF THE INVENTION

By the term "steel or steel alloy reinforcing element", there is meant any such element which is used to reinforce rubber products irrespective of size, shape or configuration. Particularly important, however, are the steel or steel alloy reinforcing elements which are used as reinforcement in the carcass of pneumatic tires. Although the reinforcing element is most commonly in the form of twisted cord when used in tires, other designs may be used as, for example, a ribbon configuration.

Since any process which involves the deposition of a coating on a metal surface requires adequate surface preparation, the initial step in the method of this invention is to provide a clean metal surface. That is, it is essential that oils, greases, waxes, weak oxide residues, mill scale and other contaminants be removed from the surface before application of the zinc phosphate coating.

The contaminants may be removed by subjecting the metal elements to a trichoroethylene vapor degreasing bath. In a preferred operation, the steel cord is immersed in boiling (85° C.) trichloroethylene. After emerging from the solvent, the cord is passed through a cloud of condensed trichloroethylene for a few seconds to rinse off the contaminated solvent with pure solvent. Although trichloroethylene is the preferred solvent other halogenated hydrocarbon solvents could be used. In most instances an exposure time to the solvent of from 8 to 30 seconds has been found to be adequate.

Detergent cleaning can be employed instead of vapor degreasing, although vapor degreasing is usually preferred. Detergent cleaning may be effected by immersing the steel cord for a period of from about 6 to 12 seconds in a detergent containing aqueous bath which has been made acidic by the presence of an inorganic acid or alkaline by including a strong base. The aqueous cleaning solution may also include materials such as surfactants, sequestering agents and other additives for improving effectiveness. During operation, the bath temperature is desirably maintained in the range of from about 60° C. to 90° C. depending upon composition.

A number of both the acidic and basic type metal cleaning compositions are available commercially. One such product of the acidic type is sold by Oakite Products, Inc. under the trademark Oakite 33. The composition may be employed at 10 percent by volume in aqueous solution at a temperature of from 60° C. to 70° C. An example of a suitable basic type metal cleaning composition is produced by the Warren Chemical Company and sold under the trademark Salta 110. This caustic cleaner may be used at a concentration of 50 grams per liter of water and at an operating temperature of about 90° C.

When employing detergent cleaning in an aqueous bath, it is important that the bath be fitted with an overflow system to insure removal of the oily film which gathers on the surface. Upon emerging from the bath, the steel cord needs to be thoroughly rinsed with hot water to remove residual bath chemicals before being passed to the phosphatizing bath. This is in contrast to cleaning by the vapor degreasing method where a hot water rinsing step is not required and the steel cord may be passed directly to the phosphatizing bath.

Aqueous cleaning procedures will frequently cause the formation of coarse grained, slow forming phosphate coatings. The apparent reason for this is that a large number of previously active centers are inactivated in the cleaning process, and, as a result, the number of nuclei are reduced. Consequently, the rate of crystallization during phosphating is reduced and larger crystals are formed. This problem may be alleviated by adding colloidal titanium dioxide to the aqueous cleaning bath. the titanium dioxide serves to provide nucleating sites for the subsequent phosphating step. Nucleation sites may also be provided by mechanical means. That is, the electrical potential of the steel surface is modified by abrading the surface. This can be accomplished by brushing, grinding, sandblasting or placing abrasive particles in the cleaning bath. The resulting abrasions provide nucleating sites for the phosphatizing procedure. However, it is important that excess abrasive or loose metal be removed, otherwise a weak boundary layer may result.

After the cleaning operation, the steel surfaces are coated with zinc phosphate. This may be accomplished by immersion in a bath which contains primary zinc phosphate in aqueous solution with phosphoric acid which ultimately yields the tertiary salt in accordance with the following reaction:

(1) $3Zn(H_2PO_4)_2 \rightleftharpoons Zn_3(PO_4)_2 + 4H_3PO_4$

The iron surface is attacked by the free phosphoric acid in the bath which results in the formation of primary an secondary iron phosphate and the liberation of hydrogen as follows:

(2) $Fe + 2H_3PO_4 \rightleftharpoons Fe(H_2PO_4)_2 + H_2$ (3) $Fe(H_2PO_4)_2 \rightleftharpoons FeHPO_4 + H_3PO_4$ As the pH at the metal-solution interface increases, the solubility levels of the secondary and tertiary salts are exceeded with the over-all reaction of (1), (2) and (3) above being as follows:

(4) $Fe + 3Zn(H_2PO_4)_2 \rightleftharpoons \dfrac{Zn_3(PO_4)_2 + FeHPO_4}{coating} + 3H_3PO_4 + H_2$ Thus, the crystalline coating formed on the surface of the steel cord is comprised largely of the insoluble tertiary zinc phosphate together with small amounts of the precipitated secondary iron phosphate.

The preferred microcrystalline zinc phosphate coatings are produced by adding accelerating agents to the bath to increase the reaction rates of the above-noted reactions. Compounds that may be used to accomplish this include various known oxidizing agents such as nitrites, nitrates and chlorates. Various organic compounds such as nitrophenols, toluidine and quinoline may likewise be used. Small additions of copper or nickel salts — called heavy metal accelerators — will also increase the reaction rates. Good results can be obtained in the microcrystalline process with phosphating immersion times in the range of from about 6 to 12 seconds. This is contrasted with immersion times of from about 10 to 20 seconds when operating without accelerating agents to produce a crystalline zinc phosphate coating. In either process the phosphating bath temperature is generally maintained at from about 70° to 90° C. to promote reaction rates.

It has been found that phosphating results can often be improved by removing the steel cord from the bath before the operation is completed. The cord is then vigorously wiped and returned into the bath to complete the phosphatizing procedure. This apparently results in a more uniform distribution of the nucleating sites on the steel surface. Such technique is particularly desirable when processing steel reinforcing elements having a ribbon configuration or steel elements of any design which have been heat treated to improve properties.

Immediately following the phosphatizing procedure, the steel surfaces are rinsed with cold water. The purpose of this step is to free the metal surface of phosphating solution. That is, the more soluble phosphates are either rinsed away or converted to the more insoluble phosphates by the surface neutralization reactions resulting from the higher pH of the rinse water. This operation may be effected by immersion in a cold water bath for a period of from about 6 to 8 seconds.

The phosphated surfaces are then subjected to a rinse with an aqueous solution containing from about 0.1 to 0.25 percent by weight of chromic acid or a water soluble chromate, with the solution being at about 75° C. The immersion time is generally between about 6 and 12 seconds. The principal purpose of this rinse is to provide improved corrosion resistance. These chromate solutions serve as water conditioners which passivate the corrosive metallic salts commonly found in rinse water supply systems and serve as an aid for chemically leaching out water soluble salts from the coating that cannot be removed by water alone. After the chromate treatment, the phosphated surfaces are rinsed with a small quantity of deionized water to remove excess chromate solution. This is followed by a final drying step after which the steel reinforcing elements are ready for application of an RFL adhesive coating.

The RFL type organic adhesive is applied to the phosphate coated steel substrate by the standard and conventionally used dip method. That is, the steel reinforcing element is passed through an aqueous system containing the RFL adhesive to deposit a coating of the adhesive on the steel surface. The steel element is then heated to cure the applied adhesive coating. The curing step will generally be in the order of from 1 to 5 minutes at temperatures in the range of from 212° F. to 500° F. At this point, the adhesive coated steel reinforcing element may be embedded in a curable rubber composition to form a partially bonded article Full bond strength is not, of course, acieved until the rubber encasing the steel is cured.

The invention is further illustrated by the following examples:

EXAMPLE 1

A 1 × 5 × 10-mil bright steel tire cord was surface treated in an aqueous bath containing a strongly alkaline commercial composition sold by the Apex Alkali Products Company under the trademark Apex 764-M. The aqueous bath contained 50 grams per liter of this alkaline composition which provided a pH in the range of about 9.5 – 10.5. The steel cord was immersed in the caustic bath which was maintained at a temperature of 85° C. for a period of about 15 seconds. This was followed by an air wipe with pressurized air and a rinse with water at 65° C. for 15 seconds.

Since this example was used as a control in various test procedures, a zinc phosphate coating was not applied and the RFL adhesive was deposited directly onto the caustic cleaned surface of the steel cord. The RFL type adhesive employed was a phenol-resorcinol-formaldehyde-latex as described in U.S. Pat. No. 3,817,778 and was applied by the conventional dip technique followed by heat curing at standard cure temperatures.

EXAMPLE 2

Bright steel tire cord of 1 × 5 × 10-mil construction was pulled off a payoff spool into a vapor degreasing unit where the cord was immersed in boiling (85° C.) trichloroethylene. After emerging from the solvent, the steel cord was passed through a cloud of condensed trichloroethylene for a few seconds. The total residence time in this unit was approximately 30 seconds.

The cord was fed directly into a zinc phosphating solution consisting of 4 to 6 percent by weight of phosphoric acid, 0.3 to 0.7 percent by weight of zinc oxide, 0.01 percent by weight of ferrous oxide (optional), and 0.2 to 1 percent by weight of sodium nitrate. The phosphating solution was maintained at a temperature of between 75° and 90° C. with the time of immersion being about 15 seconds. Rinsing of the phosphated cord was accomplished by passage through a tank of cold (20° C.) tap water, the volume of which was changed continuously via an overflow system. The rinsing time was about 15 seconds.

Following the water rinse step, the phosphated cord was passed through a tank of hot (75° C.) chromate solution (0.25 percent by weight of sodium chromate in water) with the residence time in the tank being about 15 seconds. The excess chromate solution was rinsed off by passing the cord through deionized water which took about 15 seconds. Finally, the cord was dried by passage through a heated column at a temperature of 150° C. The residence time of the cord in the heated column was 24 seconds.

Following the pre-treatment as described above, the surface of the steel cord was coated with an RFL adhesive. The adhesive composition was identical to that employed in Example 1, as was the manner in which it was applied and cured.

EXAMPLE 3

The surface of a 1 × 5 × 10-mil bright steel tire cord was cleaned and prepared for phosphatizing by immersion for 8 seconds in an aqueous bath containing a caustic cleaning composition consisting of 20 percent by weight sodium hydroxide and 20 percent by weight of tri-sodium phosphate with 5 percent by weight of a wetting agent (sodium salt of an alkylaryl sulfonate). The aqueous cleaning solution was maintained at a temperature of 60° C. Upon emerging from the aqueous cleaning bath, the steel cord was immersed in a hot (60° C.) water tank for 8 seconds to remove residual cleaning chemicals.

The cord was then fed directly into a zinc phosphating solution the composition of which is described in Example 2 at a temperature of between 75° and 90° C., with the time of immersion being about 15 seconds. The phosphated cord was then rinsed by passage through a tank of cold tap water, with the rinsing time being about 8 seconds.

Following the water rinse step, the cord was passed through a tank containing a hot (75° C.) aqueous solution of sodium chromate (0.25 percent by weight) with the residence time in the tank being about 4 seconds. The excess chromate solution was then rinsed off the steel surface by passing the cord through a bath of deionized water which took about 3 seconds. Finally, the cord was dried by passage through a heated column at a temperature of 150° C. Twenty-four seconds was used to effect this step.

Following the above pre-treatment, the surface of the steel cord was coated with an RFL adhesive. The adhesive composition was the same as that employed in Example 1, as was the manner in which it was applied and cured.

EXAMPLE 4

This example illustrates the application of a microcrystalline zinc phosphate coating to the metal surface.

The surface of a 1 × 5 × 10-mil bright steel tire cord was cleaned and prepared for phosphatizing by immersion for 6 seconds in an alkaline aqueous cleaning solution which was at a temperature of 80° C. The aqueous solution contained about 1.5 percent by weight of disodium hydrogen phosphate, 2 percent by weight of a wetting agent (a sodium salt of an alkylaryl sulfonate) and a colloidal suspension of titanium dioxide (0.01 to 0.1 percent by weight) to serve as a nucleating agent for the subsequent phosphatizing procedure. Upon emerging from the aqueous cleaning bath, the cord was rinsed for 6 seconds in a tank containing water at 85° C. to remove residual cleaning chemicals.

The cleaned cord was then fed directly into a zinc phosphating solution which consisted of 1.6 to 2.0 percent by weight of phosphoric acid, 0.1 to 0.13 percent by weight of zinc oxide, 0.1 percent by weight of nickel oxide, 0.1 percent by weight of sodium nitrate, and about 0.01 percent by weight of sodium nitrite. The immersion time in the phosphating bath was about 12 seconds. The cord, which now contained a surface conversion coating of microcrystalline zinc phosphate, was then rinsed by passage through a tank of cold water, with the rinsing time being about 6 seconds.

Following the cold water rinse, the cord was passed through a hot (75° C.) aqueous solution of sodium chromate (0.25 percent by weight). The immersion time was about 6 seconds. The excess chromate solution was then rinsed off the steel surface by passing the cord through a bath of deionized water. This operation took about 3 seconds. Finally, the cord was dried by passage through a heated column at a temperature of 100° C. The drying was effected in approximately 24 seconds.

After the above described pre-treatment was completed, the surface of the steel cord was coated with an RFL adhesive. The adhesive composition was the same as that used in Example 1, as was the manner in which it was applied and cured.

EXAMPLE 5

A 10 × 40-mil heat treated steel reinforcing element having a ribbon configuration was cleaned and prepared for phosphatizing by immersion for 6 seconds in an aqueous bath heated to a temperature of 60° C. The chemical composition of this cleaning solution is described in Example 4. After emerging from the cleaning bath, the ribbon was rinsed for 6 seconds in a tank containing water at 60° C. to remove residual cleaning chemicals. The ribbon was then fed directly into a zinc phosphating bath having the same composition as described in Example 4. The steel ribbon remained in the phosphating bath for about 12 seconds after which it was rinsed in cold water for 6 seconds.

Following the cold water rinse, the ribbon was passed through a hot (75° C.) aqueous solution of sodium chromate (0.25 percent by weight), with the immersion time being approximately 6 seconds. The excess chromate solution was then rinsed off the ribbon surface by passing the steel ribbon through a deionized water bath. This operation took about 3 seconds. Finally, the ribbon was dried by passage through a column which was heated to a temperature of 100° C. The drying step was effected in approximately 18 seconds.

After the afore-described pre-treatment was completed, the surface of the steel ribbon was coated with an RFL adhesive. The adhesive composition was identical to that described in Example 1, as was the manner in which it was applied and cured.

As is seen from a reading of the illustrative examples, the pretreatment steps are conducted in a continuous operation with the total time required being no more than from about 1 to 3 minutes.

The dry adhesive strength between rubber and the steel reinforcing elements treated in accordance with this invention was measured by the standard "H-pull" test. In preparing the test sample, a single cord is laminated into two spaced strips of rubber to form the letter H. The H-pull test measures the force required to pull the single cord, in the direction of its axis, from the strip of cured rubber in which the ends of the cord over a given length are embedded. The property measured is a shearing force acting at the cord-to-rubber interface. The values obtained are shown in Table I.

TABLE I

| Sample | *Force, lbs. |
| --- | --- |
| Example 1 (control) | 51 |
| Example 2 | 43 |
| Example 3 | 56 |
| Example 4 | 64 |
| Example 5 | 41 |

*Average of measurements on 6 samples

A further procedure for measuring dry static adhesion known as the strip adhesion or peel test was run on various test specimens. The strip adhesion test measures the force required to separate two collimated layers of steel cord cemented together by an intermediate layer of cured rubber. In addition, the appearance of the separated halves of the strip is noted and rated subjectively by visual determination of the amount of cord visible after separating the layers. A scale of 1 to 5 is used in making the ratings. When the steel cord is completely exposed after separting the layers the rating is 1.0; when 75 percent exposed the rating is 2.0; 50 percent exposure rates 3.0; a 25 percent exposure gives a rating of 4.0; and when the rubber coverage is complete and no cords are showing the rating is 5.0. The results obtained are tabulated in the following table.

TABLE II

| Sample | Separation Force, lbs. | Visual Rating |
| --- | --- | --- |
| Example 1 (control) | 53 | 4.3 |
| Example 2 | 52 | 4.7 |
| Example 3 | 46 | 5.0 |
| Example 4 | 48 | 5.0 |
| Example 5 | 47 | 4.8 |

As Tables I and II show, the test samples in which the steel element was treated in accordance with the present invention exhibit a steel to rubber dry static adhesion which is comparable and in some instances superior to that of the control wherein the zinc phosphate coating was omitted.

Since a principal object of the method of this invention is to improve the adhesion of steel to rubber in the presence of moisture, determinations were made on the effectiveness of the method for improving bond strength in aqueous environments. A procedure referred to as the "wet aging strip adhesion" test as employed in making these determinations. Samples for the test are made by first preparing a rubber pad having two collimated layers of steel cord cemented together by an intermediate layer of cured rubber. The pads are 6 × 9 inch with the cords running along the 6 inch dimension. The pads are produced from a preheated mold using a cure schedule of 30 minutes at 307° F. Approximately ⅛ inch wide strips are sheared off the 9 inch edge of the pads to expose the ends of the cords. Each pad is then cut into 12 strips ¾ inches wide. These strips which are labeled for identification are then ready for testing.

In conducting the procedure, the test strips are submerged in tap water and held at a temperature of 75° C. for a predetermined length of time. The water bath is fitted with a constant level feed to make up for evaporation loss and the bath is cleaned and filled with fresh water at the start of each new set of tests. After aging (i.e., immersion in the bath over the test period), the strips are removed from the water and dried. The strips are then pulled at room temperature and the force required to separate the two collimated layers of steel cord cemented together by an intermediate layer of cured rubber is recorded. As in the dry strip adhesion test, the appearance of the separated halves of the strip is rated subjectively by visual determination of the amount of cord visible after separating the layers. Again a rating scale of from 1 (complete exposure of cord) to 5 (no cord exposure) is used as described above for the dry strip adhesion test. The results obtained are given in the following table.

TABLE III

| Sample | Water Bath Exposure: Days | Separation Force, lbs. | Visual Rating |
|---|---|---|---|
| Example 1 (control) | 20 | 18 | 2.2 |
| Example 2 | 40 | 25 | 5.0 |
| Example 3 | 40 | 25 | 5.0 |
| Example 4 | 40 | 25 | 5.0 |
| Example 5 | 40 | 29 | 4.9 |

In order to test the hydrolytic stability of the bonds between steel, the adhesive and rubber in an actual pneumatic tire, a procedure called the cut-wet track test was run. The test involves constructing passenger car radial tires having the steel reinforcing elements to be tested incorporated therein. After the tires are constructed, they are marked with dividing lines to form four parts or quadrants. Cuts are then made into three of the four quadrants. That is, two cuts are made in one quadrant, four in another and twelve in a third with the fourth quadrant remaining intact. The cuts are of a depth sufficient to expose the outer belt and have diameters of about 3/16 of an inch. The thus prepared tires are then mounted on a standard passenger car which is driven over track surfaces in test cycles which include an 80 × 1500 feet wet oval at 12 mph, a 5 mile track at 70 mph with passes through a 1500 foot wet pad at 50 mph and a 5 mile track at 70 mph omitting the wet pad. The test continues until cord failure occurs with the mileage being recorded at failure of each test tire.

TABLE IV

|  | Failure Mileage |
|---|---|
| Four tires containing steel reinforcing elements treated in the manner of Example 1 | 8,000 |
|  | 11,000 |
|  | 14,000 |
|  | 15,000 |
| Four tires containing steel reinforcing elements treated in the manner of Example 2 | *no failure |
|  | *no failure |
|  | **no failure |
|  | **no failure |

*Test terminated at 30,000 and 42,000 miles to examine tires — no separation between steel and adhesive observed.
**Test was terminated at 55,000 miles without cord failure.

As is seen from the results reported in the above table, tires fabricated with steel reinforcing cords which had been pre-treated in accordance with the method of this invention (Ex. 2) greatly outperformed those of the control (Ex. 1), i.e., tires containing steel cords which were surface cleaned but did not receive the balance of the pre-treatment. Moreover, a post-test examination of the tires which contained steel cords treated in accordance with this invention showed that the rubber coverage of the cord was nearly 100 percent in all areas, no loss of adhesion was observed in the areas of the punctures, and no extensive corrosion of the cord was observed as was the case in the control cords of Example 1.

Although the invention has been described with respect to details of the preferred embodiments many modifications and variations thereof which clearly fall within the scope of the invention as defined by the following claims will be apparent to those skilled in the art.

We claim:

1. A method for improving the hydrolytic stability of the adhesive bond between a steel or alloy steel reinforcing element for rubber articles and an RFL type organic adhesive, said method comprising the following steps in sequence:
   a. cleaning the surface of the steel or steel alloy reinforcing element by immersion in a halogenated hydrocarbon solvent which has been heated to the boil and thereafter passing the element through condensed vapors of said solvent;
   b. coating the cleaned steel or steel alloy surface with crystalline or microcrystalline zinc phosphate;
   c. subjecting the zinc phosphate coated steel or steel alloy surface to a water rinse;
   d. immersing the phosphated steel or steel alloy surface in an aqueous solution containing from about 0.1 to 0.25 percent by weight of chromic acid or a water-soluble chromate;
   e. rinsing said surface with deionized water to remove excess chromate or chromic acid solution;
   f. drying the surface of said steel or steel alloy reinforcing element;
   g. dipping said element in an RFL type organic adhesive composition; and
   h. curing said dipped element.

2. The method in accordance with claim 1, wherein said halogenated hydrocarbon solvent is trichloroethylene.

3. The method in accordance with claim 1, wherein said zinc phosphate coating is applied from an aqueous solution in which an accelerating agent for phosphating reactions is present.

4. A steel or alloy steel reinforcing element for rubber products which has been treated in accordance with the method of claim 1.

5. A steel or alloy steel reinforcing element of ribbon configuration which has been treated in accordance with the method of claim 1.

6. A pneumatic tire containing steel or alloy steel reinforcing elements which have been treated in accordance with the method of claim 1.

7. A pneumatic tire containing steel or alloy steel reinforcing elements of ribbon configuration which have been treated in accordance with the method of claim 1.

8. A method for improving the hydrolytic stability of the adhesive bond between a steel or alloy steel reinforcing element for rubber articles and an RFL type organic adhesive, said method comprising the following steps in sequence:
 a. cleaning the surface of the steel or steel alloy reinforcing element by immersion in an alkaline or acidic, detergent containing aqueous cleaning solution maintained at a temperatue of from about 60° C. to 90° C., and thereafter rinsing said element with hot water;
 b. coating the cleaned steel or steel alloy surface with crystalline or microcrystalline zinc phosphate;
 c. subjecting the zinc phosphate coated steel or steel alloy surface to a water rinse;
 d. immersing the phosphated steel or steel alloy surface in an aqueous solution containing from about 0.1 to 0.25 percent by weight of chromic acid or a water-soluble chromate;
 e. rinsing said surface with deionized water to remove excess chromate or chromic acid solution;
 f. drying the surface of said steel or steel alloy reinforcing element;
 g. dipping said element in an RFL type organic adhesive composition; and
 h. curing said dipped element.

9. The method in accordance with claim 8, wherein titanium dioxide is added to said aqueous cleaning solution.

10. The method in accordance with claim 8, wherein said zinc phosphate coating is applied from an aqueous solution in which an accelerating agent for phosphating reactions is present.

11. A steel or alloy steel reinforcing element for rubber products which has been treated in accordance with the method of claim 8.

12. A steel or alloy steel reinforcing element of ribbon configuration which has been treated in accordance with the method of claim 8.

13. A pneumatic tire containing steel or alloy steel reinforcing elements which have been treated in accordance with the method of claim 8.

14. A pneumatic tire containing steel or alloy steel reinforcing elements of ribbon configuration which have been treated in accordance with the method of claim 8.

* * * * *